United States Patent
Chu et al.

(10) Patent No.: US 7,961,693 B2
(45) Date of Patent: Jun. 14, 2011

(54) TUNNELED DIRECT LINK SETUP COLLISION RESOLUTION IN A WIRELESS LOCAL AREA NETWORK

(75) Inventors: Liwen Chu, San Jose, CA (US); George A. Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 137 days.

(21) Appl. No.: 12/403,707

(22) Filed: Mar. 13, 2009

(65) Prior Publication Data

US 2009/0231995 A1  Sep. 17, 2009

Related U.S. Application Data

(60) Provisional application No. 61/036,410, filed on Mar. 13, 2008.

(51) Int. Cl.
*H04W 4/00* (2009.01)
(52) U.S. Cl. ........................ 370/338; 370/401
(58) Field of Classification Search .................. 370/331, 370/401, 338
See application file for complete search history.

(56) References Cited

U.S. PATENT DOCUMENTS 7,003,303 B2 * 2/2006 Khawand et al. .......... 455/452.1
7,545,786 B2 * 6/2009 Krahn et al. .................. 370/338
7,751,540 B2 * 7/2010 Whitfield et al. ........ 379/106.01

* cited by examiner

*Primary Examiner* — Ricky Ngo
*Assistant Examiner* — Chandrahas Patel
(74) *Attorney, Agent, or Firm* — Lisa K. Jorgenson; William J. Kubida

(57) ABSTRACT

Collisions between tunneled direct link setup ("TDLS") requests are resolved by associating each request with a priority value. Upon issuing a TDLS request the encapsulated frame is associated with a priority value. When a station, which is waiting for a response from a recently issued TDLS request, receives a TDLS request from another station, a collision occurs. The collision is resolved by comparing the priority value associated with the TDLS request initiated by the station and the TDLS request received. The TDLS request with the higher priority value is pursued while the TDLS request with the lower priority value is ignored. The priority value can be based on the sending station's MAC address or other value which can differentiate the TDLS requests.

14 Claims, 3 Drawing Sheets

TUNNELED DIRECT LINK SETUP COLLISION RESOLUTION IN A WIRELESS LOCAL AREA NETWORK

CROSS-REFERENCE TO RELATED APPLICATIONS

The present application relates to and claims the benefit of priority to U.S. Provisional Patent Application No. 61/036,410 filed Mar. 13, 2008, which is hereby incorporated by reference in its entirety for all purposes as if fully set forth herein.

BACKGROUND OF THE INVENTION

1. Field of the Invention

Embodiments of the present invention relate to resolving collisions in requests for setting up a direct link path between two stations in a wireless local area network.

2. Relevant Background

A 802.11 network is comprised of four primary components. These components include stations, access points, a wireless medium and a distribution system. The network is built to transfer data between stations. Stations include computing devices with wireless network interfaces. Laptop computers and handheld devices are examples of such devices. In some environments stations within a network are connected by wireless Local Area Networks ("LANs"). The 802.11 LAN standard is fast becoming the de facto standard for linking consumer electronics.

A frame on the 802.11 network must be converted to another type of frame to be delivered to a different type of network. This conversion is accomplished at an access point. Thus access points act to perform a wireless to wired bridge as well as numerous other functions. To move frames between access points the 802.11 network uses a wireless medium. The medium is controlled by a Medium Access Control ("MAC") layer. The MAC layer is complemented generally by a physical layer and a data link layer.

Wireless networks face a number of challenges that are distinct from the traditional wired network. One such challenge includes frame collisions resulting from what is know in the art as a hidden node. FIG. 1 shows three stations 110, 120, 130 of a simplified wireless LAN. In addition the reachable area 115 by station 1 110 and the reachable area 135 by station 3 130 are shown. From the perspective of station 1 110, station 3 130 would be hidden and in the same manner from the perspective of station 3 130, station 1 110 would be hidden. Thus a simply "transmit and pray" protocol may result in station 1 110 and station 3 130 transmitting simultaneously rendering station 2 120 incapable of responding. Said another way, the transmissions by station 1 110 and station 3 130 collide.

Collisions of this type can be resolved by sending "request to send" and "cleared to send" signals. Thus in a typical scenario a station would issue a request to send signal and await for a clear to send signal from each station within the requestor's reach. Upon gaining a clear to send signal the frame would be transmitted. Thereafter the receipt of the frame would be acknowledged. The clear to send signal also serves to silence other stations that gain its receipt. Thus in FIG. 1 had station 1 110 sent a request to send signal and thereafter received a cleared to send signal in return from station 2 120, station 3 130 would have also received the message that station 1 110 was cleared to send. Station 3 130 would then remain silent until it received the acknowledgment signal from station 2 120 indicating the risk of collision had passed.

While by using this method the collision is resolved, the resolution comes at the price of increased latency and decreased efficiency. A similar type of challenge exists with respect to establishing a tunneled direct link between stations via an access point. In a 802.11 wireless network, network layer protocols are conveyed using logical-link control encapsulation. One type of encapsulation is called tunnel encapsulation. FIG. 2 shows a three step process for establishing a contention based direct link between two stations as is known to one skilled in the art. In the example shown in FIG. 2, station 1 210 desires to establish a direct tunneled link with station 2 220. The conventional means to establish a tunneled direct link is via a three-way handshake using an access point as an intermediary.

Initially station 1 210 sends a Tunnel Direct Link Setup ("TDLS") request 230 to station 2 220 via the access point 215. Once received, station 2 220 responds to station 1 210 with a setup response 240. The setup response 240 causes station 1 210 to initiate a setup reply 250, which upon receipt by station 2 220 establishes the direct tunneled link. As can be appreciated by one skilled in the art, this three step process occurs over a finite period of time.

A problem occurs when both station 1 210 and station 2 220 attempt to set up a direct tunneled link at substantially the same time. In such a situation both stations 210, 220 act as initiator stations resulting in multiple collisions. Furthermore when security protocols between stations are required in the direct link setup path there are two sets of security parameters making it difficult to ascertain a master key or to begin the process to gain access to a temporary session key. These and other challenges existing in the prior art are addressed by the present invention, which is described hereafter by way of example.

BRIEF SUMMARY OF THE INVENTION

A method and computer system for collision free tunnel direct link setup between two or more stations in a wireless local area network is hereafter described. According to one embodiment of the present invention, collisions resulting from requests to establish a direct link between two or more stations at substantially the same time are resolved by associating each of the requests with a priority value. According to one embodiment of the present invention, the priority value is based on the initiating station's MAC address while in other embodiments the priority value can be based on the initiating station's Association Identifier ("AID").

According to one embodiment of the present invention, a station initiates a request to establish a tunneled direct link with another station. Once the request has been issued, the initiating station waits for a response from the target station. However at substantially the same time the originally targeted station also initiates a TDLS request identifying the original initiating station as the target. The original station, rather than receiving a response to its request, receives instead a TDLS request. The station identifies that a collision has occurred that must be resolved.

According to one embodiment of the present invention, a collision between TDLS requests is resolved by comparing a priority value associated with each request. The priority value can be based on a variety of parameters that can be associated with the sending station or can be randomly assigned. In one embodiment of the present invention the priority value of the TDLS request is associated with the MAC address of the requesting station. The MAC address of the sending station is transmitted to the receiving station along with or is associated with the TDLS request.

A station recognizing that a collision has occurred determines the MAC address associated with the recently received TDLS request and compares it to its own MAC address. In one version of the present invention, the TDLS request is initiated from a station with a lower MAC address. In this version of the present invention, a station with a low MAC address is associated with a high priority value. Thus a TDLS request associated with a high MAC address, i.e., lower priority, is ignored by the receiving station. Instead of issuing a response to the TDLS request, the receiving station issues a message indicating that a collision has occurred and that the request has been ignored. Conversely had the station determined that the received TDLS request was associated with a higher priority value than its own request, i.e. the received request is associated with a MAC address lower than its own MAC address, the station would issue a TDLS response.

According to another embodiment of the present invention, TDLS collisions are resolved by backing off the TDLS request. Upon realization that a TDLS collision has occurred, both stations involved in the collision back off from the request for a predetermined period of time before attempting another TDLS request. Each back off period is unique, and, according to one embodiment of the present invention, is based on a random number, or in another embodiment based on the MAC address of the sending station.

Establishing a secure direct link between two or more stations is addressed by another aspect of the present invention. Rather than discarding a Secure Master Key ("SMK") handshake message because a direct link has not already been established as is done in the prior art, one embodiment of the present invention conducts the MAC address verification in conjunction with establishing the direct link. Normally when a station receives a SMK handshake message the receiving station verifies the MAC address of the sending station with that of the MAC address of an existing direct link. However according to one embodiment of the present invention, the MAC address verification process includes ascertaining whether the SMK handshake message is part of a TDLS request. If the SMK handshake message is associated with an ongoing TDLS request the secure direct link setup continues in parallel with the establishment of the direct link.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE SEVERAL VIEWS OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
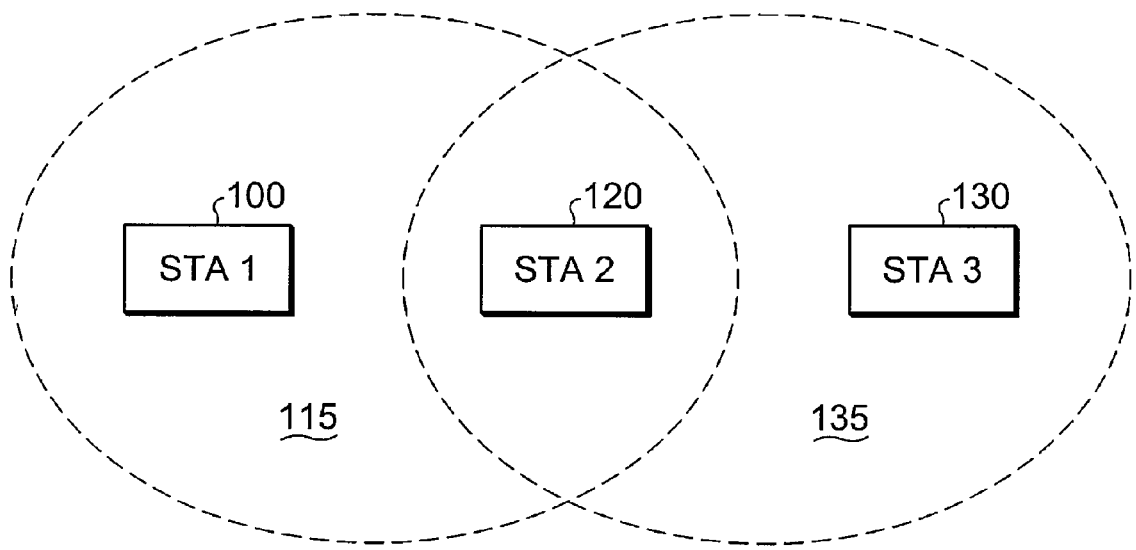
FIG. 1 shows a simplified depiction of a wireless LAN having three stations with overlapping coverage areas as would be known to one skilled in the art.
Figure 2:
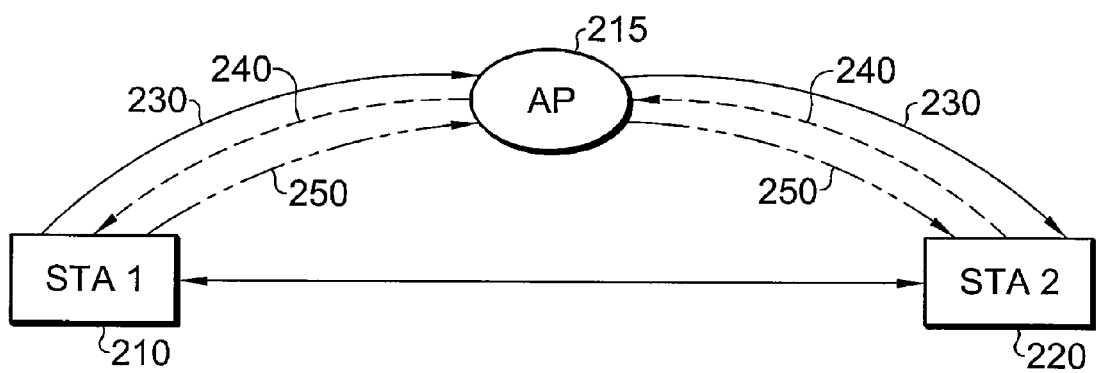
FIG. 2 shows a simplified depiction of the setup of a tunneled direct link between two stations as is known in the prior art.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

TDLS request collisions occur when two or more stations in a wireless LAN attempt to establish an encapsulated direct link at substantially the same time. As requests for a TDLS are sent, they are conveyed to a target station via an access point. Depending on the number of frames buffered in the access point a delay can occur between the time when the TDLS request is issued and the time that it is received at the target station. At substantially the same time the target station may also issue a TDLS request to setup a direct link with the same station. As the TDLS requests are encapsulated the access point is unable to perceive a collision, yet each station will be faced with a TDLS request rather than an expected TDLS response.

A station, from the time it issues a TDLS request until the time it receives a TDLS response is open to a collision. As is known in the art, collisions disrupt the ability of one station to communication or convey data to another and thus decrease the efficiency of the LAN. According to one embodiment of the present invention, collisions are resolved based on a priority scheme associated with each TDLS request.

According to one embodiment of the present invention, each TDLS request includes the initiating station's MAC address. The MAC address can be conveyed as part of the request or simply associated with the frame carrying the request in a manner known to one skilled in the relevant art. After a TDLS request has been issued a station enters a listening mode awaiting a response from the targeted station. Normally the targeted station responds to the TDLS request with a response indicating it is or is not capable of establishing a tunneled direct link. After receiving the response the initiating station issues a reply and a direct like is established.

According to one embodiment of the present invention, during the time in which the initiating station is awaiting a TDLS response it instead receives a TDLS request from the station to which it has just sent its TDLS request. The result is a collision. The present invention resolves the collision, according to one embodiment, by determining which request has a higher priority. In one version of the present invention, the priority value associated with the TDLS request is based on the MAC address of the sending station. A TDLS requested from a station having a high MAC address has a lower priority than one with a low MAC address. In another embodiment of the present invention, the AID is used to base the priority value. One skilled in the relevant art will recognize that the assignment of the priority value can be based on many factors and can in another embodiment be random. Regardless of the means by which the priority value is assigned the collision is resolved by comparing these priority values.

In one embodiment of the present invention, a priority value is assigned based on the MAC address of the station sending the TDLS request. Upon identifying that a collision has occurred, the station compares the priority value of its own request based on its own MAC address with the priority value of the TDLS request received. When the received TDLS request is associated with a high MAC number and thus a low priority value, it is ignored. Conversely when the received request is associated with a low MAC number and thus a high priority value, the station, in one embodiment, abandons its own TDLS request and issues a TDLS response to the recently received request.

Figure 3:
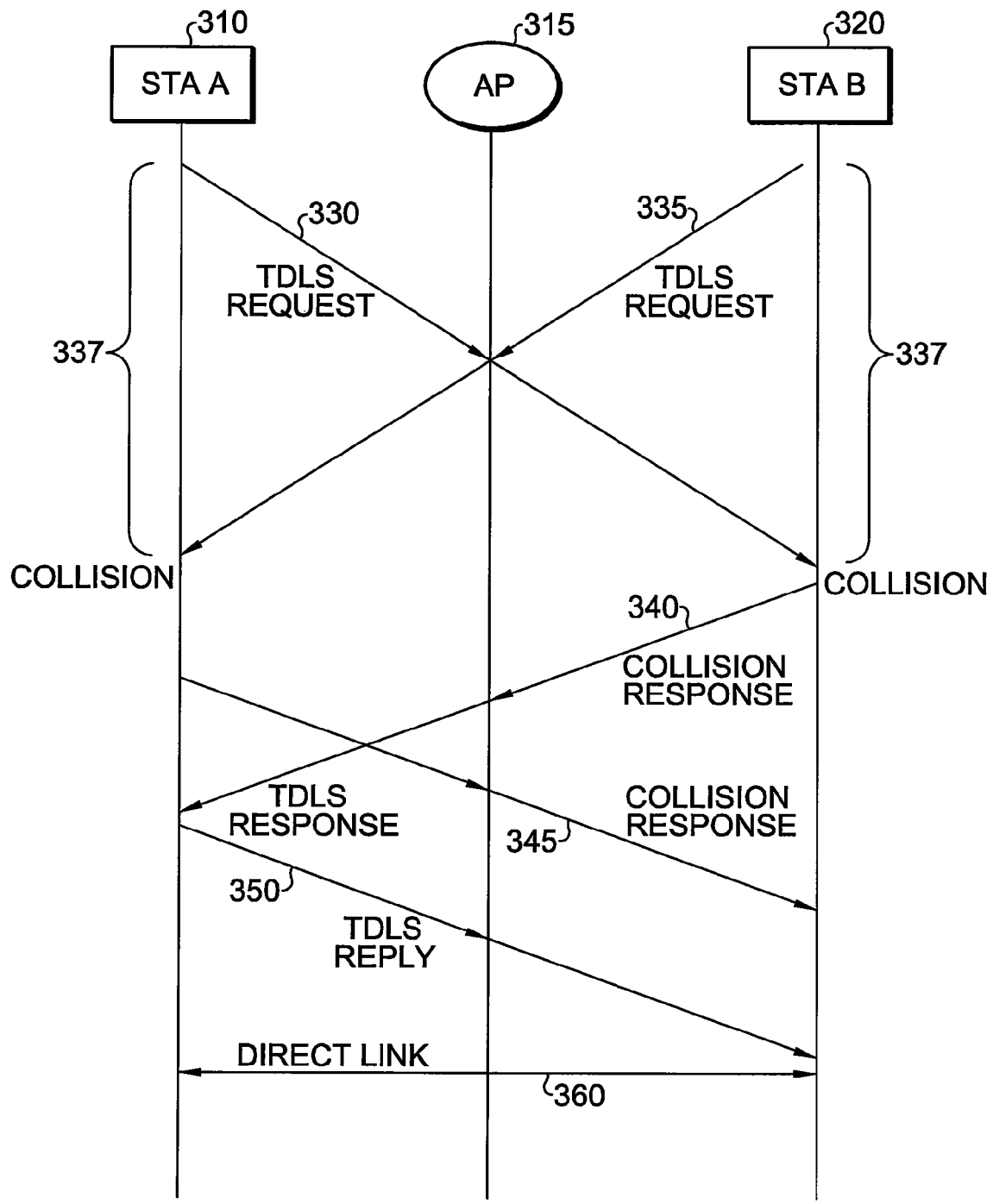
FIG. 3 shows a communication flow involved in a TDLS in which collision between requests occurring at substantially the same time are resolved, according to one embodiment of the present invention.

FIG. 3 is a depiction of a communication exchange between two stations and an access point in a wireless LAN in which TDLS request collisions are resolved according to an embodiment of the present invention. At substantially the same time station A 310 and station B 320 each issue a TDLS request 330, 335 directed at the other station. Both requests are encapsulated and are exchanged via an access point 315. After issuing the TDLS requests both stations enter a listening window 337 during which each expects to receive a TDLS response.

Rather than receiving the expected TDLS response, both station A 310 and station B 320 receive a TDLS request 335, 330 (respectively) from the other station. Each request has associated with it the MAC address of the sending station. Upon receiving the TDLS request both stations 310, 320 recognize that a collision has occurred that must be resolved. Each station 310, 320 independently compares the priority value associated with its own TDLS request 330, 335 and the TDLS request received 335, 330. Assume for the purposes of this example that the priority value of the TDLS request is synonymous with the MAC address of the sending station. Accordingly, to resolve the collision each station compares its own MAC address as a proxy for the priority value of its TDLS request to the MAC address of the station that sent the TDLS request. Thus Station A 310 would, upon receiving the TDLS request 35 from Station B 320 compare its MAC address with the MAC address of station B 320.

In the scenario depicted in FIG. 3 the MAC address of station A 310 is smaller than the MAC address of station B 320. Thus the TDLS request 330 issued by station A 310 has a higher priority than the TDLS request 335 issued by station B 330. One skilled in the art will recognize that the assignment of priority values with respect to a MAC address is arbitrary and is not intended to constrict the scope of the present invention. Just as a large MAC address may be associated with a low priority value, so too could a small MAC address be associated with a low priority value. Indeed a value other than MAC addresses may be used to base the priority value, including random numbers.

Upon determining that the received TDLS request 335 possesses a lower priority value than the TDLS request 330 that it issued, station A 310 ignores the received TDLS request 335. Rather than issuing a TDLS response, station A 310 instead issues a communication response 345 to station B 320 indicating a collision has occurred and that the TDLS request 335 has been ignored. Station A 310 may also just ignore the received low priority request without sending any response Conversely station B 320, having determined that the received TDLS request 330 possesses a higher priority that its TDLS request 335, abandons its TDLS request 335 and issues a TDLS response 340 directed to station A 310. Station A 310 responds to the TDLS response 340 with a TDLS reply 350 and shortly thereafter a direct link 360 between station A 310 and station B 320 is established.

According to another embodiment of the present invention, a TDLS request collision is not resolved using a priority value associated with each TDLS request but by a scheme by which each initiating station backs off from the TDLS request. When a collision has been identified, both TDLS requests are ignored and abandoned and each station enters a waiting period (back off period) during which no TDLS requests are issued. Upon the expiration of the waiting period the station is free to reinstitute the TDLS request process. The waiting period or time period during which no TDLS requests are issued varies and can be generated by a variety of means as would be known to one skilled in the relevant art. For example, upon recognition that a TDLS collision has occurred, both stations could enter a waiting period whose length was determined by a random number. According to one embodiment of the present invention, the time intervals of the waiting periods can be large enough to ensure that the next TDLS request will not result in a similar collision. For example the difference in the two waiting periods can be such that the difference is larger than the average time a station would expect to wait to receive a response from a TDLS request.

Another aspect of the present invention relates to the establishment of a secure direct link. Normally a secure direct link is established by exchanging SMK handshake messages. Upon receipt of such a message the peer MAC address is verified against an existing direct link. If no direct link exists the SMK handshake message is dropped and a secure direct link fails to be established.

One embodiment of the present invention includes the SMK handshake message with the TDLS request process. Rather than dropping the SMK handshake message because a direct link has not yet been formed, the present invention verifies the peer MAC address with the MAC address associated with the TDLS request. Thus at each step of the SMK handshake message the TDLS request, response and reply act to form a secure link For example and according to one embodiment of the present invention, upon receipt of a first SMK handshake message the peer station verifies the initiator's MAC address against an existing direct link or the first SMK handshake message being part of a TDLS request. If a direct link does not exist or if the SMK handshake message is not part of the TDLS request, the receiving station discards the message.

Likewise the initiator of a TDLS request upon receipt of a second SMK handshake message verifies the peer MAC address against an existing direct link or the second SMK handshake message being part of the TDLS response. Again if there is no direct link or the TDLS response lacks the second SMK handshake message, the message is discarded.

Lastly when the peer station receives a third SMK handshake message it verifies the initiator's MAC address against an existing direct link or whether the third SMK handshake message is part of the TDLS reply/confirm message. If a direct link does not exist or the TDLS reply message fails to include the third SMK handshake message, the initiator discards the message. In this manner SMK handshake messages can be exchanged in conjunction with the TDLS process making the establishment of a secure direct link more efficient.

Figure 4:
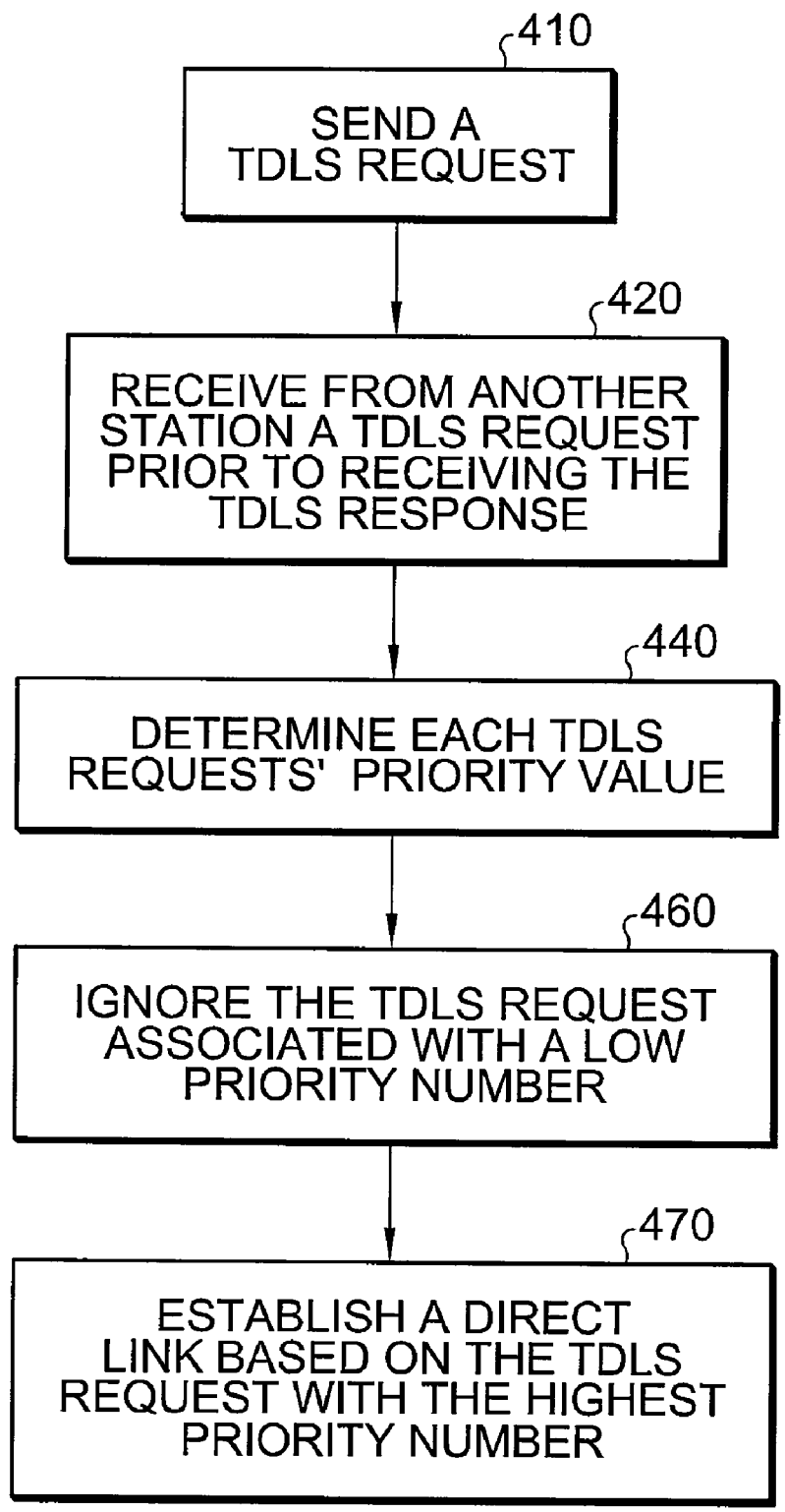
FIG. 4 is one embodiment of a flowchart of a method for resolving TDLS request collisions according to the present invention.

FIG. 4 is a flowchart illustrating methods of implementing an exemplary process for resolving TDLS request collisions in a wireless LAN. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

As shown in FIG. 4 the collision resolution process begins at substantially the same time as the sending 410 of a TDLS request. Thereafter each request issuing station receives 420 from another station a TDLS request prior to receiving a TDLS response from the TDLS request that it issued. The collision results from a station being unable to respond to a pending request as it is currently awaiting a response from a request that it issued.

The process continues, in this embodiment of the present invention, by determining 440 a priority value associated with each TDLS request. In one version of the present invention, the priority value of the TDLS request is based on the MAC address of the sending station. In another version the priority value is based on the AID value and in another the priority value is randomly determined. Once the priority value of each TDLS request involved in the collision is determined, they are compared to ascertain which TDLS possesses the highest priority value.

According to one embodiment of the present invention, the TDLS request associated with the lowest priority value is ignored 460 while the TDLS request possessing a high priority number is answered pursuant to establishing a direct link 470 between the stations.

In a preferred embodiment, the present invention can be implemented in software. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

An exemplary system for implementing the invention includes a general purpose computing device in the form of a conventional personal computer, a personal communication device or the like, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory generally includes read-only memory (ROM) and random access memory (RAM). A basic input/output system (BIOS), containing the basic routines that help to transfer information between elements within the personal computer, such as during start-up, is stored in ROM. The personal computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer, such as magnetic cassettes, flash memory cards, digital video disks, random access memories (RAMs), read-only memories (ROMs) and the like may also be used in the exemplary operating environment.

A number of program modules may be stored on the hard disk, magnetic disk, ROM or RAM, including an operating system, one or more application programs or software portions, other program modules and program data. A user may enter commands and information into the personal computer through input devices such as a keyboard and pointing device. Other input devices may include a microphone, joystick, game pad, satellite dish, scanner or the like. These and other input devices are often connected to the processing unit through a serial port interface that is coupled to the system bus, but may be connected by other interfaces, such as a parallel port, game port or universal serial bus (USB). A monitor or other type of display device may also be connected to the system bus via an interface, such as a video adapter.

A personal computer may operate in a networked environment using logical connections to one or more remote computers, such as a remote computer. The remote computer may be another personal computer, a server, a router, a network PC, a peer device or other common network node, and typically includes many or all of the elements described above relative to the personal computer. The logical connections described herein include LAN and wide area networks (WAN). Such networking environments are commonplace in offices, enterprise-wide computer networks, Intranets and the Internet.

When used in a LAN networking environment, the personal computer is connected to the local network through a network interface or adapter. When used in a WAN networking environment, the personal computer typically includes a means for establishing communications over the wide area network, such as the Internet. This means is connected to the system bus via the serial port interface. In a networked environment, program modules depicted relative to the personal computer, or portions thereof, may be stored in the remote memory storage device. It will be appreciated that the network connections shown are exemplary and other means of establishing a communications link between the computers may be used.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

While there have been described above the principles of the present invention in conjunction with resolving collisions between TDLS requests in a wireless LAN, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A computer system for collision free tunneled direct link setup between two or more stations in a wireless local area network, the computer system comprising:
   a machine capable of executing instructions embodied as non-transitory software; and
   a plurality of software portions, wherein
   one of said software portions is configured to identify a collision between a tunneled direct link setup request initiated by the two or more stations at the same time directed at establishing a common tunneled direct link path;
   responsive to identifying a collision, one of said software portions is configured to prioritize each of the two or more stations wherein at least one of the two or more stations has a high priority; and
   one of said software portions is configured to establish a tunneled direct link initiated by the at least one of the two or more stations having the high priority,
   wherein the at least one of the two or more stations having the high priority sends a response to other stations initiating a tunneled direct link setup request indicating a collided setup.

2. The computer system of claim 1 wherein tunneled direct link setup requests initiated by stations not having the high priority are ignored.

3. The computer system of claim 1 wherein responsive to security being required between the two or more stations, further comprising a software portion configured to include a security master key with each tunneled direct link setup request.

4. The computer system of claim 1 wherein each of the two or more stations is prioritized based on a medium access control address associated with each station.

5. The computer system of claim 4 wherein a low medium access control address is associated with a high priority.

6. The computer system of claim 5 wherein each tunneled direct link setup request initiated by the two or more stations includes the medium access control address associated with that station.

7. A computer system for collision free tunneled direct link setup between two or more stations in a wireless local area network, the computer system comprising:
   a machine capable of executing instructions embodied as non-transitory software; and
   a plurality of software portions, wherein
   one of said software portions is configured to identify a collision between a tunneled direct link setup request initiated by two or more stations at the same time directed at establishing a common tunneled direct link path;
   responsive to identifying a collision, one of said software portions is configured to ignore each request;
   one of said software portions is configured to inhibit tunneled direct link setup requests for a period of time; and one of said software portions is configured to reinitiate tunneled direct link setup requests upon expiration of the period of time,
wherein the at least one of the two or more stations having the high priority sends a response to other stations initiating a tunneled direct link setup request indicating a collided setup.

8. The computer system of claim 7 responsive to security being required between the two or more stations, further comprising one of said software portions configured to include with each tunneled direct link setup request a security master key.

9. The computer system of claim 7 wherein the period of time is randomly determined for each of the two or more stations.

10. A method for resolving tunneled direct link setup request collisions between two stations in a wireless local area network, the method comprising:
at each of a first station and a second station, sending respectively a first tunneled direct link setup request and a second tunneled direct link setup request, wherein each request is associated with a priority value;
receiving respectively, at the same time, at the first station and the second station, the second tunneled direct link setup request and the first tunneled direct link setup request; and
resolving a collision between the first tunneled direct link setup request and the second tunneled direct link setup request by comparing the priority values associated with each tunneled direct link setup request,
wherein responsive to the first station receiving a tunneled direct link setup request associated with a low priority value, ignoring the tunneled direct link setup request and sending to the second station a response indicating a tunneled direct link setup request collision has occurred.

11. The method of claim 10 wherein the tunneled direct link setup request includes a medium access control address associated with at least one of the two or more stations sending the tunneled direct link setup request.

12. The method of claim 11 wherein the priority value of each tunneled direct link setup request is based on the medium access control address of the sending station.

13. A station within a wireless local area network operable to establish a collision free tunneled direct link with another station within the wireless local area network, the station comprising:
a machine capable of executing instructions embodied as non-transitory software;
a memory operable for storing a plurality of software portions, wherein
one of said software portions is configured to send a first tunneled direct link setup request to the another station;
one of said software portions is configured to receive, at the same time, a second tunneled direct link setup request from the another station, establishing a tunneled direct link setup request collision; and
one of said software portions is configured to resolve the tunneled direct link setup request collision,
wherein the first tunneled direct link setup request is associated with a first priority value and wherein the second tunneled direct link setup request is associated with a second priority value, the software portion configured to resolve the tunneled direct link setup request collision compares the first priority value with the second priority value, a software portion configured to ignore the second tunneled direct link setup request responsive to determining that the first priority value is higher than the second priority value, and responsive to resolving the tunneled direct link setup request collision, the station sends a response to the another station indicating a collision has occurred.

14. The station according to claim 13 wherein the software portion configured to resolve the collision inhibits tunneled direct link setup requests for a random period of time.

* * * * *